Aug. 16, 1932.    A. O. ABBOTT, JR    1,871,438
METHOD OF MANUFACTURING TIRE CASINGS
Filed March 15, 1928
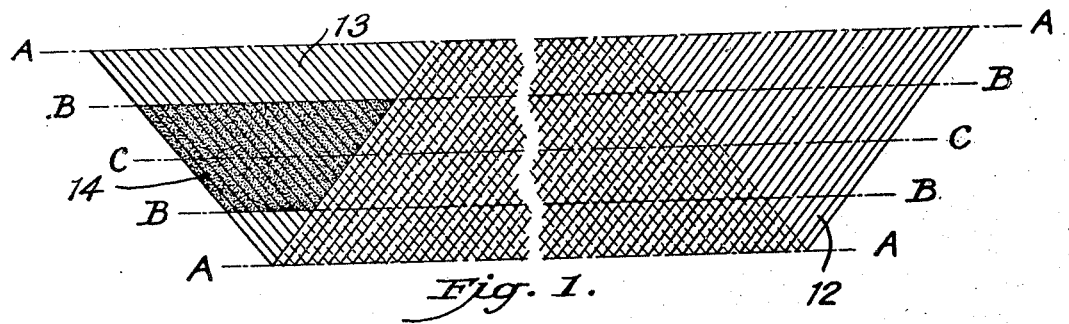
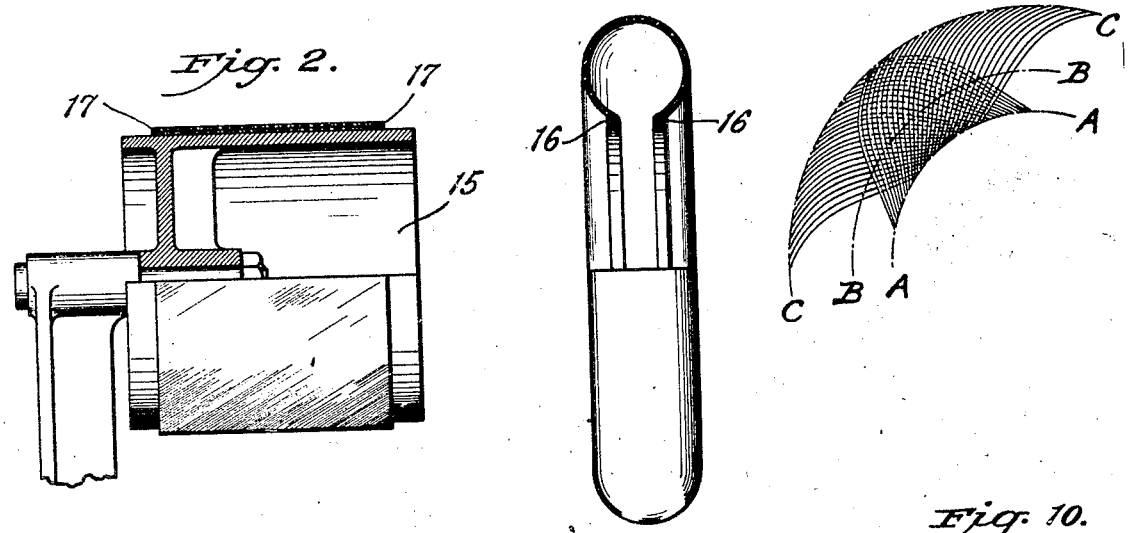
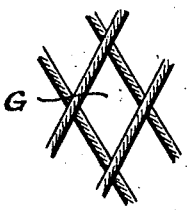
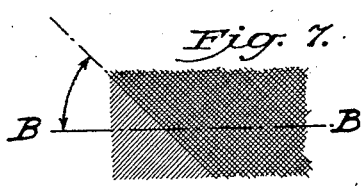
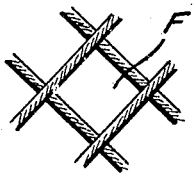
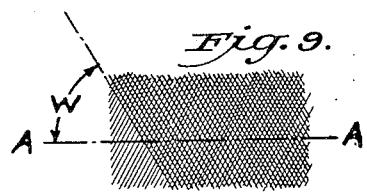
INVENTOR.
BY
ATTORNEYS.

Patented Aug. 16, 1932

1,871,438

UNITED STATES PATENT OFFICE

ADRIAN O. ABBOTT, JR., OF DETROIT, MICHIGAN, ASSIGNOR TO MORGAN AND WRIGHT, OF DETROIT, MICHIGAN, A CORPORATION OF MICHIGAN

METHOD OF MANUFACTURING TIRE CASINGS

Application filed March 15, 1928. Serial No. 261,832.

This invention relates to pneumatic tires for vehicles and method of making same, but more particularly to tires which are expanded during the building operation, and has for its primary object to increase the life of the tire by the elimination of harmful action which generally takes place between the various elements and particularly the fabric plies.

In the forming of pneumatic tires by the flat or pulley band method, it is customary to superimpose two or more plies of rubberized fabric, reinforce these at the edges by bead wires and, by any of the well known forming methods, expand that portion between the beads into tire shape. Other constituents of the tire may also be expanded in this operation but the present invention is concerned particularly with the action of the fabric plies.

It is generally recognized that the angles of the cords in the superimposed plies undergo changes during the shaping operation and the general tendency of these changes is to conform to established laws of mechanics. In practice it has been found that in every case where the normal cord spacing is such that an angular change cannot take place freely and without considerable effort to displace the gum contained in the meshes formed by superimposing the plies in alternate thread angle relation, as commonly practiced at the present time, harmful action occurs. This action causes an undue resistance to the peripheral elongation of the fabric envelope, resulting in an excessive change in the angular relation of the cords in the alternate plies. Such resistance is more pronounced at the extreme periphery and graduates to a minimum in the side wall of the formed tire. It is therefore advantageous to provide some means whereby the displacement of material in the cord meshes will be minimized, at the same time eliminating excessive strain on the cords and allowing them to take a more natural position in the formed tire. This may be accomplished by providing lubrication between adjacent plies so that the plies are free to slide over each other and thus reducing the resistance during the expanding operation. The tire is given a more natural and symmetrical shape than it assumes under the present conditions. This lubricant preferably should not be detrimental to the adhesiveness of the rubber material after vulcanization. Therefore, the most advantageous material for this purpose is one which possesses lubricating qualities at normal temperatures, but which is fused and absorbed by the rubber at vulcanization temperatures.

Various forms of lubricant are suitable for this purpose and particularly certain heavy-metallic salts of the higher fatty acids, as for example, zinc stearate or metallic salts of aromatic or hydroaromatic acids, as for example, zinc benzoate or zinc resinate. These substances in the small amounts required are sufficiently soluble in rubber as to be entirely absorbed thereby during vulcanization and the normal adhesiveness is restored to the surfaces upon which the lubricant was applied.

Various methods may be utilized for applying the lubricant to the tire elements, as for example, dusting it upon a surface in a dry state or by applying it in suspension as a paint. The lubricant may be either applied to the entire contacting faces of the tire elements or to those zones where considerable movement of the cords takes place.

The many other objects and advantages of the invention will be better understood by reference to the following specification when considered in connection with the accompanying drawing illustrating the principles thereof in which;

Fig. 1 is a diagrammatic plan view of a plied slab made in accordance with the principles of the invention;

Fig. 2 is an elevation partially in section of a drum on which the plied slab of Fig. 1 is spliced to form a pulley band;

Fig. 3 is an elevation partially in section of the pulley band of Fig. 2 after it has been expanded to tire form;

Fig. 4 is a diagrammatic view illustrating the path of the cords in the expanded band or formed tire; and Figs. 5 to 11 are detailed diagrammatic views illustrating the cord movements produced by the expanding operation.

Referring to the drawings, Figs. 1—3 illustrate one method of building a pneumatic tire in accordance with the present invention. Strips of bias cut cord fabric as 12 and 13 are superimposed with the cord angles alternating to form a flat slab. Zinc stearate or other satisfactory lubricant is interposed between the contacting faces of these strips or certain areas thereof and in the present embodiment the lubricated zone is indicated by shading, as at 14. After the slab is formed, the ends are spliced to form a flat band usually called a "pulley band" and this operation may be advantageously performed on a suitable drum as 15 (Fig. 2). The usual beads 16 are generally applied to the margins 17 of the band while it is upon this drum. The pulley band is then removed from the drum and expanded in any well known manner. The form after the expansion is illustrated in Fig. 3. The tire thus formed is then vulcanized in the usual manner. In a general way, these steps outline the procedure in the building of a tire in accordance with the present invention. However, it will be appreciated that certain of these steps may be very materially changed or even omitted and the principles of the invention may be applied to various building methods. Instead of applying the lubricant to a restricted zone, it will be evident that it may be applied throughout the width of the band but it has been found in practice that the zone indicated is sufficient.

When the flat slab, as shown in Fig. 1 is placed upon the drum 15, no substantial change takes place in the relative position or angular relation of the cords as the fabric is not stretched more than is necessary to fit it snugly about the drum. The change occurs during the expanding operation.

For the purpose of illustrating the movement of the cords during the expanding operation, a series of diagrammatic figures have been included in the drawing. Fig. 4 illustrates the approximate arrangement of the cords in adjacent plies (of which there may be any suitable number) at the completion of this operation. The arrangement in different zones of the tire are illustrated more in detail in Figs. 5, 7 and 9 which respectively show the zones in the vicinity of the lines C—C, B—B and A—A. A much enlarged mesh from these zones of Figs. 5, 7 and 9 is respectively shown in Figs. 6, 8 and 10. Fig. 11 shows a mesh in a zone intermediate the zones of Figs. 5 and 7.

When the band has been expanded to tire form, the diameter of the inner periphery or that of zone A—A has not changed, as this is the same as the diameter of the drum and therefore there has been no increase in the cord spacing. At the outer periphery, or zone C—C, the spacing has materially increased and this has produced a corresponding change in the cord angles. For examples, it has been found that if the original cord angle designated by W (Fig. 9) is approximately 51°, the corresponding angle X (Fig. 5) in the zone C—C will be approximately 35°. The spacing of the cords generally increases gradually from the inner periphery or zone A—A to the outer periphery or zone C—C and the meshes pass through corresponding progressive stages of change. In the original position of the cords or that of zone A—A, it will be seen from Fig. 10 that the parallelogram is longer radially than peripherally. In zone B—B intermediate the inner and outer peripheries, the radial dimension has descreased and the peripheral dimension has correspondingly increased, as shown in Fig. 8. At the outer periphery or zone C—C, the radial dimension is considerably less than the peripheral, as shown in Fig. 6. Area F in the mesh formed by cords in adjacent plies, as shown in Fig. 8, is obviously greater than the corresponding area G in the mesh of Fig. 10. Therefore, as the rubber is easily extensible, the resistance to this stage of expansion is slight. As the change progresses, there is little resistance until the position of Fig. 11 is reached for the area H approximately equals the area G, the height and length of the parallelogram being reversed but equal. Beyond this, the area diminishes as illustrated at K (Fig. 6) and, in the absence of a lubricant, a crowding effect is produced which tends to displace the rubber component by compression, and the true peripheral spacing of the cords can be obtained only by a crowding of the cords into the rubber and a bulging of the rubber. This limits the peripheral expansion over a comparatively wide lateral zone and theretofore has resulted in a flattened tread effect.

If a lubricating substance be applied to the contacting faces of the plies of the carcass, either locally or over the entire area, according to the present invention the contiguous plies of cords will be able to slip or shift slightly relative to one another, and the cords in each ply will be able to assume more nearly perfect geodetic lines between their anchoring points at the beads of the casing. In the prior practice where no lubricating substance was used between the plies, the adhesiveness of the rubber composition, restricted any slip or shifting of the cords in one ply relative to the cords in the neighboring ply. It is believed that at the points where cords in neighboring plies cross one another the cords swing like a hinge on its pintle to some extent at least. In the present invention, on the other hand, the non-adhesiveness of the rubber prior to vulcanization prevents to some extent, if not entirely, any such hinging movement of a cord in one ply relative to the point it crosses over the cord in the neighboring ply, and thus by not restricting the cords from assuming geodetic lines, permits the carcass assemblage to assume a more natural shape in the transformation from flat or pulley-band form to approximately tire form. In still other words, the mesh formed by any two pairs of crossing cords in the old practice has been eliminated, the pair of cords in each ply functioning during the shaping operation independently of the other pair, at least to the extent that the hinging action at the crossing points of the cords has been eliminated by the presence of the lubricating substance on the contacting faces of the plies. But whatever may be the theory or explanation of the present invention, the advantage is apparent in the completed tire which, when made according to this invention, possesses greater resiliency, flexibility and resistance to fatigue than one produced without the use of a lubricant between the plies.

Where a lubricant is used which is fusible and soluble in the rubber at vulcanizing temperatures, this lubricant entirely disappears during the vulcanization process and the adhesive qualities of the rubber are restored prior to the completion of vulcanization. This enables the elements to be permanently fixed in their expanded position by the vulcanization. While it has been found in practice that the use of a lubricant which is fusible and soluble in the rubber composition at the vulcanizing temperature thereof is usually advantageous, yet the present invention is not limited to the use of such a lubricant and the beneficial movement or adjustment of the cords may be obtained with any substance permitting the desired movement of the cords during the shaping operation.

While the invention has been disclosed as applied to the manufacture of cord tire casings, in its broadest aspects it is not limited thereto, being applicable, with some measure of advantage, to fabric casings. Likewise also in its broadest aspects, the invention is applicable to any tire building method or process in which, after assemblage, there is at any time, an advantage in affording the plies of the carcass greater freedom to movement. In the claims the term "band form" is employed broadly to cover flat building in distinguishing from core building.

Having thus described my invention what I claim and desire to protect by Letters Patent is:

1. That method of manufacturing tire casings which consists in, assembling constituent rubberized ply-rubber and bead-elements in band form, interposing between the contacting faces of the rubberized-plies material which possesses adhesion preventing qualities at normal temperatures but not at a vulcanizing temperature, shaping the band to approximately tire form, and vulcanizing.

2. That method of manufacturing tire casings which consists in, assembling constituent rubberized ply-rubber and bead-elements in band form, interposing between the bead elements and circumferentially of the contacting faces of the rubberized-plies material which has adhesion preventing qualities at normal temperatures and being fusible and substantially soluble in rubber at vulcanizing temperatures, shaping the band to approximately tire form and vulcanizing.

3. That method of manufacturing tire casings which consists in assembling plies of rubberized fabric into band form with the surfaces of the adjacent plies in contact, applying an adhesion preventing substance between contacting faces of the rubberized plies, the substance being such that it acts as a lubricant at ordinary temperatures and does not impair the adhesion of the rubber when vulcanized, shaping the band to approximately tire form, and vulcanizing.

4. That method of manufacturing tire casings which consists in assembling plies of rubberized fabric into band form with the surfaces of the adjacent plies in contact, applying to the contacting faces of the plies any of a group of substances which comprises zinc stearate, zinc benzoate, and zinc resinate, shaping the band to approximately tire form, and vulcanizing.

5. That method of manufacturing tire casings which consists in assembling plies of rubberized fabric into band form with the surfaces of the adjacent plies in contact, applying to the contacting faces of the plies any of a group of substances which comprises metallic stearates, metallic benzoates and metallic resinates, shaping the band to approximately tire form, and vulcanizing.

6. That method of manufacturing tire casings which consists in assembling plies of rubberized fabric into band form with the surfaces of the adjacent plies in contact, applying to the contacting faces of the plies any of a group of substances which comprises heavy metallic salts of higher fatty acids, heavy metallic salts of aromatic acids and heavy metallic salts of hydroaromatic acids, shaping the band to approximately tire form, and vulcanizing.

7. That method of manufacturing tires which consists in assembling a plurality of plies of rubberized fabric in superimposed relation with a lubricating coating which becomes ineffective at the vulcanizing temperature of rubber disposed between at least portions of a pair of adjacent plies, shaping the plies to conform to the shape of a tire carcass while permitting relative movement between the plies, and vulcanizing the shaped plies to cause them to unite over their entire engaging surfaces.

8. That method of manufacturing tires which consists in assembling a plurality of plies of rubberized fabric in superimposed relation with a lubricating coating which becomes ineffective at the vulcanizing temperature of rubber disposed between at least portions of adjacent plies, shaping the plies to conform to the shape of a tire carcass while permitting relative movements between the plies, and vulcanizing the shaped plies to cause them to unite over their entire engaging surfaces.

Signed at Detroit, county of Wayne, State of Michigan, this 9th day of March, 1928.

ADRIAN O. ABBOTT, Jr.